United States Patent [19]
Best et al.

[11] Patent Number: 5,128,461
[45] Date of Patent: Jul. 7, 1992

[54] MOLDING COMPOUND BASED ON STARCH ETHER FOR SHAPING BIODEGRADABLE MOLDED PARTS

[75] Inventors: Bernd Best, Moerfelden; Rainer Frische, Frankfurt am Main; Renate Gross-Lannert, Dietzenbach; Klaus Wollmann, Limburg/Lahn, all of Fed. Rep. of Germany

[73] Assignee: Battelle-Institut e.V., Frankfurt am Main, Fed. Rep. of Germany

[21] Appl. No.: 654,621

[22] PCT Filed: Jun. 22, 1990

[86] PCT No.: PCT/EP90/00998

§ 371 Date: Feb. 25, 1991

§ 102(e) Date: Feb. 25, 1991

[87] PCT Pub. No.: WO91/00313

PCT Pub. Date: Jan. 10, 1991

[30] Foreign Application Priority Data

Jun. 23, 1989 [DE] Fed. Rep. of Germany ....... 3920621

[51] Int. Cl.$^5$ ............................ C08L 3/08; C08K 5/00; C08K 5/09
[52] U.S. Cl. .................................. 536/111; 527/300; 527/313
[58] Field of Search ................ 536/111; 527/300, 313

[56] References Cited

U.S. PATENT DOCUMENTS

| | | | |
|---|---|---|---|
| 3,329,509 | 7/1967 | Julius | 524/35 |
| 4,112,222 | 9/1978 | Jarowenko | 536/111 |

FOREIGN PATENT DOCUMENTS

| | | |
|---|---|---|
| 1493215 | 6/1969 | Fed. Rep. of Germany . |
| 2409665 | 9/1974 | Fed. Rep. of Germany . |
| 2708513 | 8/1978 | Fed. Rep. of Germany . |
| 935339 | 8/1966 | United Kingdom . |

OTHER PUBLICATIONS

"Neue polymere Werlstoffe . . . " J. Folge; Elias, Vohwinkel Carl Hanser Verlag Münhen Wien 1983.

*Primary Examiner*—Nathan M. Nutter
*Attorney, Agent, or Firm*—Spencer, Frank & Schneider

[57] ABSTRACT

The invention describes a method of producing a molding compound on the basis of starch and a plasticizer starting product, characterized in that the starch and the plasticizer starting product are simultaneously reacted with ethylene oxide in one and the same reaction vessel.

6 Claims, No Drawings

MOLDING COMPOUND BASED ON STARCH ETHER FOR SHAPING BIODEGRADABLE MOLDED PARTS

TECHNOLOGY REVIEW

It is known that films and thermoplastic molded parts can be produced from starch, in particular from the unbranched component of starch, amylose. In addition, it is known that modified starches, in particular special starch ethers, can be used to make films and molded parts which often have improved performance characteristics. Thus, it is possible, for example, to produce more flexible films and molded parts from starch ethers. In this case, solid, isolated starch ethers are used as starting material.

Starch ethers formally are reaction products between hydroxyl groups of the glucose units of starch molecules and alcoholic hydroxyl groups of other compounds. Molded parts made from hydroxyethyl and hydroxypropyl starch ethers are particularly suited for producing flexible films.

Hydroxyethyl or hydroxypropyl groups are introduced into the starch molecule by reacting the respective alkylene oxides with starch in aqueous alkali; chlorohydrins, e.g. ethylene chlorohydrin and epichlorohydrin, are also suited. The conditions for producing oxethylated starches are outlined in numerous patent specifications, but exact details are disclosed in very rare cases only.

Introduction of hydroxyethyl and hydroxypropyl groups into the starch molecule strongly affects the gelling properties of starches. The gels are clearer, and their susceptibility to retrogradation on cooling and aging is much lower than that of the initial starches.

Improvement of flexibility and of the other positive material properties that can be achieved by etherification is proportional to the degree of etherification. It should be noted, however, that the character of starch as a natural substance decreases with increasing etherification.

Another approach to modifying the material properties is to use appropriate additives. The number of additives found to have a positive effect is limited. Polyols such as, for example, glycol and glycerol are preferably used.

SUMMARY OF THE INVENTION

The object of the invention is to obtain degradable and environmentally compatible materials of high service value by combining starch etherification with addition of additives. It has been found particularly advantageous to use oxethylated compounds, in particular citric acid, as additives, and high-amylose and amylose starches have been found to be particularly suitable starches

DETAILED DESCRIPTION OF THE INVENTION

Surprisingly, it is possible according to the invention, provided that appropriate reaction conditions are maintained, to chemically react mixtures of starch and citric acid with the respective epoxides, in particular ethylene oxide, simultaneously in a "single-batch" reaction, which is advantageous and involves little effort, and thus to obtain basic compounds for producing films and molded parts. In this way, basic compounds can be produced which have good performance characteristics even at a low degree of oxethylation. The low degree of oxethylation also enables particularly high weight percentages of starch and citric acid in the basic compounds to be achieved, and thus products to be made from hardly modified natural substances. Since epoxides are more expensive raw material components than starch and citric acid, the method according to the invention is much superior to the prior art also in this respect.

An additional great advantage is that the properties of the basic compounds and thus of the final products to be produced can be systematically modified by varying the epoxide addition.

Details of the invention are given in the following examples.

These are comparison examples; the reaction has not been optimized.

EXAMPLE 1

Etherification of Amylose and Citric Acid with Ethylene oxide 8.1 g (0.05 M) amylose and 0.96 g (0.005 M) citric acid, dissolved in 5 ml distilled water, are spread by rubbing with 25 ml distilled water, suspended in 200 ml 1-N caustic soda solution, and stirred in an inert gas (nitrogen) atmosphere until complete dissolution. In the course of two hours, 18.5 g (0.42 M) ethylene oxide is introduced, with continuous stirring, into the clear, highly viscous solution by means of a delivery tube. After standing for about 12 hours at room temperature, the reaction mixture is neutralized with hydrochloric acid and dialyzed into distilled water. To prepare films, the solution is concentrated, poured onto an appropriate substrate and dried. Other molded parts are produced from the solid compound which can be precipitated from the above-described solution with acetone.

Properties of Film 1: clear and transparent, highly soluble in water, very soft, slightly sticky, highly flexible and extensible.

As compared with Film 1, films made from a low-substituted hydroxyethyl starch (degree of substitution about 0.1 to 0.3) and 10 % citric acid ethylene oxide adduct as plasticizer additive are substantially harder, hardly flexible and in some cases still brittle, but just as clear and transparent.

COMPARISON EXAMPLE 1

According to the conventional procedure and analogous to Example 1, 8.1 g amylose (0.05 M) is reacted with the 8-fold amount of ethylene oxide (0.4 M) that is theoretically necessary. The isolated starch product then shows a relatively high degree of oxethylation of about 1. Films produced from this basic compound are soft, flexible and extensible, but not sticky as, for example, Film 1.

It is thus possible in the oxethylation of amylose and citric acid in a single-batch reaction to substantially reduce the amount of the expensive ethylene oxide and nevertheless to obtain a basic compound from which highly flexible, extensible, but not too brittle and/or too sticky films can be produced. The property profile of the films can be varied selectively by the amount of ethylene oxide or by the ratio of citric acid to amylose. Further examples in this respect will follow.

What is claimed is:

1. A single-batch method comprising simultaneously reacting effective amounts of starch and a plasticizer with ethylene oxide in one reaction vessel to produce a film or molding compound.

2. The method according to claim 1, wherein salts, water, or mixtures thereof are removed after the reaction with the ethylene oxide.

3. The method according to claim 1, wherein said starch is amylose, high amylose or mixtures thereof.

4. The method according to claim 1, including reacting citric acid as an additive.

5. The product produced by the process of claim 1.

6. The product produced by the process of claim 3.

* * * * *